Patented Mar. 11, 1930

1,750,198

UNITED STATES PATENT OFFICE

WALTHER SCHRAUTH, OF BERLIN-BRITZ, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

CLEANING, WETTING, AND EMULSIFYING

No Drawing. Application filed May 25, 1926, Serial No. 111,666, and in Germany May 30, 1923.

I have found that such isocyclic sulfonic acids that is to say sulfonic acids of aromatic and hydroaromatic hydrocarbons, as are substituted in the nucleus by one or several radicals of aliphatic or hydroaromatic hydrocarbons containing more than four carbon atoms, are very valuable substitutes for soaps, for example ordinary soft or grain or textile soaps. They are at least as useful as soaps as regards their wetting and emulsifying power, and are very suitable, whether employed in the form of free acids or in the form of salts, for use as agents for wetting and producing lather in treating textile and other fibrous materials with aqueous baths, for example in washing, fulling, cleaning, removing stains and the like as well as for dissolving or emulsifying solvents and other organic liquids or substances practically insoluble in water, such as hydrocarbons, higher alcohols, waxes, oils and the like which will henceforth be referred to as organic compounds practically insoluble in water. They have the very desirable property of being very readily soluble even in cold water and of being inclined only very little or not at all to separate from solutions or mixtures.

The sulfonic acids to be used in accordance with the present invention may be derived from aromatic hydrocarbons, such as for example benzene, toluene, naphthalene, anthracene and their homologues or from hydroaromatic hydrocarbons, such as tetra- or hexahydro-benzene, hydrogenated naphthalenes and the like. Generally, those derived from polynuclear hydrocarbons are best suitable. The said sulfonic acids can be prepared for example by sulfonating mononuclear or polynuclear hydrocarbons which are once or several times substituted by aliphatic or hydroaromatic hydrocarbon residues containing more than 4 carbon atoms or by acting on sulfonated hydrocarbons at an elevated temperature with alcohols containing more than 4 carbon atoms, such as amyl alcohols, hexyl alcohols and the like, or cyclic alcohols, for example cyclo-hexanol, methyl-cyclo-hexanol and so forth, or with unsaturated hydrocarbons, such as amylene, hexylene and the like, in the presence of condensing agents, preferably sulfuric acid. As examples of alcohols which can be readily condensed for example with naphthalene sulfonic acid, the amyl alcohols obtainable from fusel oil, such as di-ethyl-carbinol and the like, or amyl alcohols obtained in any other way may be mentioned. Also higher alcohols for instance such as are found in natural waxes and the like, for example cetyl alcohol and so forth, or alcohols obtained artificially for example by the reduction of stearine, namely the alcohols obtained by the reduction of the carboxylic acids contained in stearine and of the ketone stearone, may be employed. The aforesaid cyclic hydrocarbons may also be condensed with suitable alcohols in the presence of condensing agents such as sulfuric acid, and sulfonated, whether subsequently and separately, or in a single operation. Instead of one alcohol, mixtures of several alcohols may also be employed.

In this application I do not lay claim to the employment of the said sulfonic acids or their salts in dyeing textile or other fibrous materials, such process being already claimed in application for patent Ser. No. 62,932.

The following examples will further illustrate how the present invention may be carried out in practice, but the invention is not limited to these examples. The parts are by weight.

Example 1

600 parts of naphthalene are converted into naphthalene beta-sulfonic acid by acting on it with 720 parts of sulfuric acid at a temperature of from 110° to 180° C. Thereupon the reaction mixture is cooled to 105° C. and while maintaining this temperature and stirring well, a solution prepared at about 20° C. from 620 parts of di-ethyl-carbinol or another amyl alcohol and 40 parts of sulfuric acid, is added in the course of 4 hours. The mixture is then heated to 125° C. for 4 hours. The stirrer being stopped after that time, the mass separates into two layers the lower of which, consisting of sulfuric acid, is withdrawn. From the upper layer the rest of unaltered sulfuric acid is removed by precipitating it with lime. The solution of amylated naphthalene sulfonic acid so obtained is neutralized with sodium carbonate and the sodium salt can be obtained in the form of a solid cake by evaporation in vacuo. It is comminuted, and may be employed as an agent for wetting, emulsifying and producing lather. By mixing it with liquids insoluble in water products which can be readily emulsified, for example boring oils, spinning oils and the like are obtained. By wetting the salt with some water and mixing it with about 50 per cent of its weight of purified petroleum jelly, a product resembling a soft soap and possessing a very high washing power is obtained. The mixing process may be carried out at room temperature, and the duration of the operation depends on the effectiveness of the apparatus, stirrers and the like employed for this purpose. The mixing process is completed when the mass is sufficiently homogeneous.

*Example 2*

100 parts of tetra-hydro-naphthalene are mixed with 5 parts of the amylated naphthalene sulfonic acid described in Example 1. The mixture can be diluted with water with the formation of milk-like emulsions which may be employed for example in bucking or other treatment of textile materials. The amounts of water added vary, according to the purposes to which the emulsions are to be put. The product may also be employed in acid baths, for instance in baths containing sulfuric acid as are used in felting or in removing incrustations from fibres and the like, without the emulsions becoming unstable.

*Example 3*

125 parts of naphthalene and 100 parts of cyclo-hexanol are mixed in a vessel lined with lead, with 120 parts of concentrated sulfuric acid and heated to 50° C. for 5 hours, while stirring continuously. Thereupon, the stirrer being stopped, the mass separates into two layers the lower of which consisting of aqueous sulfuric acid is removed. The remaining cyclo-hexyl-naphthalene is converted into cyclo-hexyl-naphthalene sulfonic acid by adding concentrated sulfuric acid at a low temperature while stirring. The said sulfonic acid is converted into its sodium salt in the usual manner. This salt can be employed directly for cleaning purposes. By dissolving 1 part of it in 9 or 10 parts of a mixture of ethyl alcohol of about 96 per cent strength and a mineral oil for example, shale oils, such as kerosene, yellow oil, lubricating oil, a boring oil is obtained the emulsions of which are extraordinarily stable.

*Example 4*

1 part of naphthalene is mixed in a vessel lined with lead with 1 part of methyl-cyclohexanol obtainable by hydrogenation of cresylic acid, and with 2 parts of concentrated sulfuric acid. The mixture is stirred at a temperature of from 80° to 90° C. until it forms a clear solution in water. A mixture of sulfonic acids of the isometric methyl-cyclohexyl-naphthalenes is obtained which can be converted into sodium salts in the usual manner. They can be employed either directly or in combination with organic solvents for example as a liquid textile oil.

*Example 5*

Beta-naphthalene sulfonic acid is prepared in the usual manner from 64 parts of naphthalene. The reaction mixture is cooled to about 105° C. and diluted with 50 parts of concentrated sulfuric acid whereupon a mixture of 102 parts of hexyl alcohol and 100 parts of concentrated sulfuric acid is slowly added while maintaining the mass at about 105° C. and stirring well. The stirring is continued until all of the alcohol has been condensed. On cooling to room temperature, the mixture separates into two layers the upper of which is worked up in the manner described in Example 1. The sodium salt of the hexylated naphthalene sulfonic acid so obtained has excellent wetting properties.

What I claim is:

1. The process of preparing aqeous emulsions of organic compounds practically insoluble in water characterized by an addition of an aromatic sulfonic acid substituted by at least one residue of an aliphatic hydrocarbon containing more than 4 carbon atoms to an aqueous medium containing the aforesaid organic compounds.

2. The process of preparing aqueous emulsions of organic componds practically insoluble in water characterized by an addition of a sulfonic acid of a polynuclear hydrocarbon substituted by at least one residue of an aliphatic hydrocarbon containing more than 4 carbon atoms to an aqeous medium containing the aforesaid organic compounds.

3. The process of preparing aqueous emulsions of organic compounds practically insoluble in water characterized by an addition of a naphthalene sulfonic acid substituted by at least one residue of an aliphatic hydrocarbon containing more than 4 carbon atoms to an aqueous medium containing the aforesaid organic compounds.

4. The process of preparing an aqueous non-acid bath of high wetting power which comprises adding to the bath comprising an aqueous medium an aromatic sulfonic acid substituted by at least one residue of an aliphatic hydrocarbon containing more than 4 carbon atoms.

5. The process of preparing an aqeous bath of high wetting power which comprises adding to the bath comprising an aqueous medium a naphthalene sulfonic acid substituted by at least one residue of an aliphatic hydrocarbon containing more than 4 carbon atoms.

6. The process of treating fibrous materials by means of a bath comprising an aqueous medium comprising an aromatic sulfonic acid substituted by at least one residue of an aliphatic hydrocarbon containing more than 4 carbon atoms.

7. The process of treating fibrous materials by means of a bath comprising an aqueous medium comprising a naphthalene sulfonic acid substituted by at least one residue of an aliphatic hydrocarbon containing more than 4 carbon atoms.

8. A composition of matter comprising an organic compound practically insoluble in water and an aromatic sulfonic acid substituted by at least one residue of an alphatic hydrocarbon containing more than 4 carbon atoms.

9. A composition of matter comprising an organic compound practically insoluble in water and a naphthalene sulfonic acid substituted by at least one residue of an aliphatic hydrocarbon containing more than 4 carbon atoms.

In testimony whereof I have hereunto set my hand.

WALTHER SCHRAUTH.